United States Patent [19]

Morita

[11] 4,144,817
[45] Mar. 20, 1979

[54] TROLLEY CONVEYOR

[75] Inventor: Minoru Morita, Tokorozawa, Japan

[73] Assignee: Tsubakimoto Chain Co., Osaka, Japan

[21] Appl. No.: 787,279

[22] Filed: Apr. 13, 1977

[30] Foreign Application Priority Data

Jul. 21, 1976 [JP] Japan .............................. 51-96089[U]

[51] Int. Cl.² ............................................ E01B 25/22
[52] U.S. Cl. .................................. 104/108; 16/95 R;
104/93; 104/106; 104/133; 198/685
[58] Field of Search ............... 104/106, 107, 108, 109,
104/89, 94, 93, 110, 172 S, 133; 16/87.4 R, 94
R, 95 R, 96 R; 105/148, 150, 155; 198/685, 861

[56] References Cited

U.S. PATENT DOCUMENTS

| 695,406 | 3/1902 | Lynn | 104/108 |
|---|---|---|---|
| 1,923,853 | 8/1933 | Van Duyn | 16/96 R X |
| 2,323,807 | 7/1943 | Ferris et al. | 16/95 R |
| 2,715,966 | 8/1955 | Tieck | 104/94 UX |
| 3,011,456 | 12/1961 | Lyons | 104/108 X |
| 3,265,011 | 8/1966 | Golden | 104/106 X |
| 3,820,466 | 6/1974 | Allen | 104/133 X |
| 3,965,824 | 6/1976 | Winkler et al. | 104/108 X |

FOREIGN PATENT DOCUMENTS 1011954 12/1965 United Kingdom ..................... 104/108

Primary Examiner—Francis S. Husar
Assistant Examiner—Randolph A. Reese
Attorney, Agent, or Firm—Howson and Howson

[57] ABSTRACT

A trolley conveyor comprising a hollow guide rail within which an endless conveyor chain is centrally supported by guide rollers. A plurality of spaced U-shaped hangers supported by said chain extend through a longitudinal opening in one side of the guide rail spaced above the bottom of the rail. The lower side of the guide rail below the opening is inclined outwardly and serves to contain foreign matter present within the guide rail as well as to catch matter falling from above. The hangers each include a projection adjacent the longitudinal opening which serves to prevent the splashing of foreign matter from the interior of the guide rail out through the opening.

6 Claims, 2 Drawing Figures

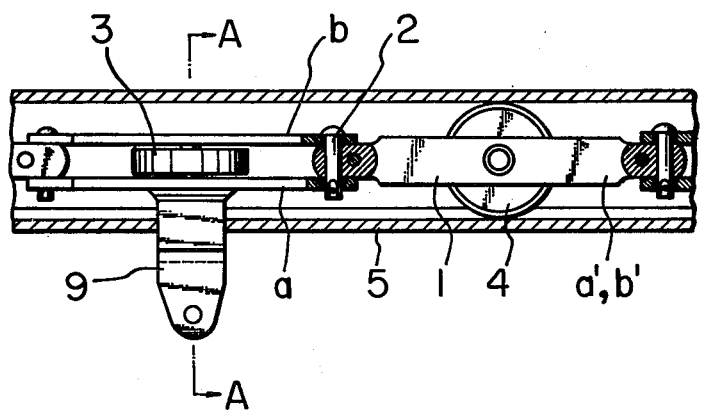
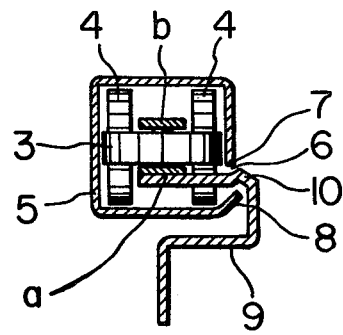

TROLLEY CONVEYOR

BACKGROUND OF THE INVENTION

The present invention relates generally to conveying apparatus and more particularly to a trolley conveyor of an improved construction.

Trolley conveyors have been widely used in manufacturing plants to convey articles of manufacture from one station to another or to convey objects from one section of the plant to another section. Typically, the articles of manufacture are carried in an exposed fashion on trays suspended from the conveyor hangers. Should the conveyed articles be clothing, the clothing is hung in an unprotected condition beneath the conveyor.

With many manufactured products such as clothing, food, electrical assemblies, etc. it is important that foreign matter such as waste oil, dust and the like be prevented from dropping from the overhead conveyor mechanism onto the conveyed goods. In known types of trolley conveyors wherein the conveyor hangers extend from the bottom of the guide rail, excess lubricant from the conveyor chain or bearing members and the dust and dirt which tends to accumulate on these members is free to randomly drop from the conveyor rail onto the conveyed products or the floor below. Such contamination of the products or the surface beneath the conveyor is undesirable and may render the products valueless.

It is accordingly a primary object of the present invention to provide a trolley conveyor of a construction which prevents lubricants and foreign matter carried by the conveyor mechanism from escaping from the conveyor guide rail.

Additional objects and advantages of the invention will be more readily apparent from the following detailed description of the preferred embodiment thereof.

BRIEF SUMMARY OF THE INVENTION

The trolley conveyor of the present invention includes a hollow guide rail within which an endless conveyor chain is centrally supported by guide rollers. A plurality of spaced U-shaped hangers supported by the chain extend through a longitudinal opening in one side of the guide rail. The side of the guide rail below the opening is inclined outwardly to contain foreign matter accumulating on the bottom of the guide rail as well as to catch matter falling from above. Each of the hangers includes a projection which cooperates with the longitudinal opening to further minimize the possibility of foreign matter escaping from the rail through the opening.

BRIEF DESCRIPTION OF THE DRAWINGS

FIG. 1 is a side elevational view partly in section of a portion of a trolley conveyor in accordance with the present invention; and FIG. 2 is a sectional view taken along line A-A of FIG. 1.

DESCRIPTION OF THE PREFERRED EMBODIMENT

With reference to the drawings, the preferred embodiment of the trolley conveyor includes a conveyor chain 1 comprising a plurality of pairs of parallel link plates a and b, which are alternatingly connected by pins 2 with a plurality of pairs of link plates a' and b' lying perpendicular to the plates a and b. Each of the pairs of link plates a and b, and a' and b' are respectively provided with guide rollers 3 and 4 rotatably connected thereto. Since the rollers 3 are rotatable about a vertical axis while the rollers 4 are rotatable about a horizontal axis, the rollers 3 and 4 are perpendicular to each other.

The conveyor chain 1 and the guide rollers 3 and 4 are disposed internally within a hollow guide rail 5 which is generally box-shaped in cross section as shown in FIG. 2. The guide rollers 4 bear against the bottom of the guide rail 5 and the guide rollers 3 maintain the central position of the conveyor chain 1 between the rail side walls, permitting the conveyor chain to travel smoothly through the guide rail. Although only a short length of the guide rail and chain are shown, it will be understood that the rail and chain are endless, and that the chain movement is provided by a mechanized drive means (not shown).

A longitudinal opening 6 in the lower part of one side wall of the guide rail 5 spaced above the bottom of the guide rail extends the full length of the guide rail. The side wall of the guide rail below the opening 6 is outwardly inclined so that the upper edge 8 thereof protrudes outwardly with respect to the lower edge 7 of the upper side wall. Hangers 9 attached at suitable intervals to the conveyor chain 1 by connection to the link plates a thereof extend outwardly through the opening 6. The hangers 9 are each of a U shape with the free end thereof extending downwardly in substantially the same vertical plane with the conveyor chain 1. A portion of the upper flange of each hanger is raised to form a projection 10 which protrudes beyond the edge 7 of the guide rail side wall.

For operation of the trolley conveyor, the conveyor chain is moved as indicated above along the guide rail and is centrally disposed within the guide rail by the horizontal and vertical guide rollers 3 and 4. The articles to be conveyed are suspended from the hangers 9 in a conventional manner. The outwardly inclined lower edge 8 of the guide rail side wall below the opening 6 not only prevents oil and dust collecting inside the guide rail from falling onto the conveyed articles, but also receives dust falling from above. At the same time, the projection 10 on the upper flange of each hanger reduces the gap between the hanger and the upper edge of the opening, thereby preventing splashing of staining matters collecting inside the guide rail from passing through the opening.

Accordingly, by means of the construction shown and described, the conveyor apparatus in accordance with the invention can convey perishable articles such as clothing without danger of staining due to oil and dust collecting in and falling from the guide rail. The invention in addition improves the working environment in the vicinity of the conveyor by maintaining the cleanliness of the area and preventing air pollution.

Although the present conveyor is illustrated utilizing a specific link-type conveyor chain, it will be obvious that the improvement of the invention would be equally applicable to other types of endless chain or belt constructions.

Manifestly, changes in details of construction can be effected by those skilled in the art without departing from the spirit and scope of the invention.

I claim:

1. A trolley conveyor comprising a hollow guide rail, a conveyor chain disposed within said guide rail and adapted for movement therealong, said hollow guide rail having a narrow continuous longitudinal opening in one sidewall thereof spaced above the bottom of the guide rail, said opening dividing said sidewall into upper and lower sidewall portions, said lower sidewall portion being outwardly inclined so as to protrude outwardly beyond said upper sidewall portion to thereby provide an inwardly sloping surface serving to return to the guide rail any foreign matter falling thereon, a plurality of hangers attached at spaced intervals to said conveyor chain and extending through said longitudinal opening, each said hanger including a projection thereon adjacent the upper edge of said opening to prevent material from flowing along said hanger outwardly through said opening and to effectively reduce the size of the opening above each said hanger.

2. A trolley conveyor as claimed in claim 1 wherein each said hanger is substantially U-shaped, and wherein said projection is formed on the upper flange thereof.

3. A trolley conveyor as claimed in claim 1 wherein the free end of each said hanger extends downwardly in substantially the same vertical plane as said conveyor chain.

4. A trolley conveyor as claimed in claim 1 wherein said hollow guide rail has a box-shaped rectangular section.

5. A trolley conveyor as claimed in claim 1 including horizontal and vertical guide rollers connected with said conveyor chain for supporting and positioning said chain within said hollow guide rail.

6. A trolley conveyor comprising a hollow guide rail having a substantially box-shaped rectangular section, a conveyor chain disposed within said guide rail and adapted for movement therealong, horizontal and vertical guide rollers connected with said conveyor chain for supporting and positioning said chain within said hollow guide rail, said hollow guide rail having a narrow continuous longitudinal opening in one sidewall thereof spaced above the bottom of the guide rail, said narrow opening dividing said sidewall into upper and lower sidewall portions, said lower sidewall portion being outwardly inclined so as to protrude outwardly beyond said upper sidewall portion to thereby provide an inwardly sloping surface serving to return to the guide rail any foreign matter falling thereon, a plurality of hangers attached at spaced intervals to said conveyor chain and extending through said longitudinal opening, each said hanger being substantially U-shaped and including a projection thereon adjacent the upper edge of said opening, each said projection protruding upwardly and outwardly from the hanger to prevent foreign matter from flowing along said hanger upper edge outwardly through said opening and to effectively reduce the opening above each said hanger, the free end of each said hanger extending downwardly in substantially the same vertical plane as said conveyor chain.

* * * * *